United States Patent
Kwak et al.

(10) Patent No.: US 10,039,068 B2
(45) Date of Patent: Jul. 31, 2018

(54) METHOD AND TERMINAL FOR SYNCHRONIZING IN DISTRIBUTED WIRELESS COMMUNICATION

(71) Applicant: Electronics and Telecommunications Research Institute, Daejeon (KR)

(72) Inventors: Byung-Jae Kwak, Daejeon (KR); Kapseok Chang, Daejeon (KR); June-Koo Rhee, Seongnam-si (KR); Junhyuk Kim, Daegu (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 385 days.

(21) Appl. No.: 14/702,117

(22) Filed: May 1, 2015

(65) Prior Publication Data

US 2015/0341875 A1 Nov. 26, 2015

(30) Foreign Application Priority Data

| May 2, 2014 | (KR) | ......................... 10-2014-0053638 |
| May 9, 2014 | (KR) | ......................... 10-2014-0055883 |
| Apr. 27, 2015 | (KR) | ......................... 10-2015-0059240 |

(51) Int. Cl.
*H04W 56/00* (2009.01)
*H04L 12/807* (2013.01)
*H04L 12/64* (2006.01)

(52) U.S. Cl.
CPC ....... *H04W 56/001* (2013.01); *H04L 12/6418* (2013.01); *H04L 47/27* (2013.01)

(58) Field of Classification Search
CPC .................................................. H04W 56/001
See application file for complete search history.

(56) References Cited

U.S. PATENT DOCUMENTS 6,256,334 B1 * 7/2001 Adachi ............... H04B 1/7143
370/252
7,620,014 B1 * 11/2009 Marques-Pucheu . H04B 7/2621
370/330

(Continued)

FOREIGN PATENT DOCUMENTS

| KR | 1020120048978 A | 5/2012 |
| KR | 1020130086462 A | 8/2013 |

OTHER PUBLICATIONS

Osvaldo Simeone et al., Distributed Synchronization in Wireless Networks, IEEE Signal Processing Magazine, Sep. 2008, pp. 81-97, vol. 25, No. 5, D.3.3—v1.00.

(Continued)

*Primary Examiner* — Hassan Kizou
*Assistant Examiner* — Deepa Belur
(74) *Attorney, Agent, or Firm* — William Park & Associates Ltd.

(57) ABSTRACT

A method of synchronization in a distributed wireless communication system and a terminal supporting the same are disclosed. A terminal increases its contention window value if it receives a synchronization signal within a synchronization slot. The terminal decreases its contention window value if it receives no synchronization signal within the synchronization slot. The terminal determines whether to transmit a synchronization signal or not by using the increased or decreased contention window value.

14 Claims, 7 Drawing Sheets

(56) References Cited

U.S. PATENT DOCUMENTS

| | | | |
|---|---|---|---|
| 2003/0103521 A1* | 6/2003 | Raphaeli | H04B 3/542 370/445 |
| 2007/0237168 A1* | 10/2007 | Courtay | H04L 63/1441 370/445 |
| 2010/0135319 A1* | 6/2010 | Wang | H04W 74/0875 370/445 |
| 2011/0075642 A1* | 3/2011 | Cordeiro | H04W 74/0816 370/338 |
| 2013/0070781 A1* | 3/2013 | Vedantham | H04L 12/413 370/447 |
| 2013/0188653 A1 | 7/2013 | Kim et al. | |
| 2014/0073372 A1 | 3/2014 | Lee et al. | |
| 2014/0098667 A1* | 4/2014 | Choi | H04W 74/085 370/230 |
| 2014/0211781 A1 | 7/2014 | Kim et al. | |
| 2015/0244601 A1* | 8/2015 | Wentink | H04L 43/04 370/253 |
| 2016/0197705 A1* | 7/2016 | Ryu | H04L 1/18 370/242 |
| 2017/0257850 A1* | 9/2017 | Oh | H04W 72/042 |
| 2017/0280445 A1* | 9/2017 | Jiang | H04W 72/0446 |

OTHER PUBLICATIONS

Daniel Aronsson et al., Link Level Procedures for the WINNER System, Information Society Technologies, Nov. 30, 2007.

Byung-Jae Kwak et al., Performance Evaluation of Fully Distributed Synchronization Mechanism for PAC, May 19, 2014, IEEE 802.15-14-0249-02-0008.

Byung-Jae Kwak et al., Updates on Fully Distributed Synchronization Scheme for PAC, Sep. 14, 2014, IEEE 802.15-14-0554-00-0008.

Draft Std. for Wireless Medium Access Control (MAC) and Physical Layer (PHY) Specifications for Peer Aware Communications (PAC), Sep. 2014, Athens, Greece.

Byung-Jae Kwak et al., Proposed Text for Fully Distributed Initial Synchronization, Nov. 2014, IEEE 802.15-14-0678-02-0008.

Byung-Jae Kwak et al., Updated Proposal on Fully Distributed Synchronization Scheme for PAC, Jan. 2015, IEEE 802.15-15-0053-01-0008.

Byung-Jae Kwak et al., Fully Distributed Synchronization Scheme for PAC with Additional Simulations, Mar. 2015, IEEE 802.15-15-0191-03-0008.

* cited by examiner

METHOD AND TERMINAL FOR SYNCHRONIZING IN DISTRIBUTED WIRELESS COMMUNICATION

CROSS-REFERENCE TO RELATED APPLICATION

This application claims priority to and the benefit of Korean Patent Application Nos. 10-2014-0053638, 10-2014-0055883, and 10-2015-0059240 filed in the Korean Intellectual Property Office on May 2, 2014, May 9, 2014, and Apr. 27, 2015, respectively, the entire contents of which are incorporated herein by reference.

BACKGROUND OF THE INVENTION (a) Field of the Invention

The present invention relates to a method of synchronization in a distributed wireless communication system and a terminal supporting the same.

(b) Description of the Related Art

Wireless communication systems may be roughly classified into synchronous communication systems and asynchronous communication systems.

In a synchronous wireless communication system, terminals are synchronized to a common reference clock, and the time domain is divided into repeated intervals called frames. Each frame is subdivided into smaller intervals called slots. A system where a signal is transmitted or received within a slot is referred to as a synchronous wireless communication system.

Synchronous communication may be classified into centralized synchronization communication and distributed synchronization communication. A typical example of centralized synchronization communication is a cellular system, where a base station provides synchronization signals. A terminal transmits and receives signals by using radio resources within a frame structure defined with respect to a synchronization signal (timing reference signal) provided by the base station. Distributed synchronization communication is a method of synchronization in which terminals within a network participate in the transmission of synchronization signals, rather than in which a specific device transmits synchronization signals. Distributed synchronization communication allows for synchronization between terminals within a network, even without a communication infra-structure or a specific device that transmits synchronization signals. Hence, this method is suitable for device-to-device (D2D) communication networks or temporary networks (ad hoc networks).

An asynchronous wireless communication system is a system in which terminals transmit and receive signals without the use of a fixed reference clock. In the asynchronous wireless communication system, the terminals constantly monitor radio channels for signal reception because they do not know when signals are to be received. Upon detecting a wireless packet while monitoring, the terminal estimates the start point of the packet using a preamble signal contained in the wireless packet, and then reads packet information. Asynchronous communication can be easily implemented because it uses no fixed reference clock, and is therefore used mainly for systems that do not require high resource efficiency. However, this type of communication consumes much electric power since terminals need to monitor radio channels all the time.

The following is a type of distributed synchronization communication. Each terminal cyclically transmits a synchronization signal by using its own time synchronization, i.e., reference clock. Then, each terminal receives synchronization signals transmitted by neighboring terminals, and then synchronizes its clock by using the received synchronization signals.

The synchronization signals used herein may include a pulse signal, a ZC (Zadoff-Chu) sequence, an m-sequence, a chirp signal, etc. The terminals cannot receive the synchronization signals transmitted by neighboring terminals during synchronization signal transmission because synchronization signal transmission and reception cannot occur simultaneously. In this method, however, if terminals are densely populated, synchronization signals transmitted by the terminals may be received while overlapping each other, thus causing an error in the estimation of the time of receipt of the synchronization signals. Moreover, if the same radio channel is used by neighboring heterogeneous networks in an unlicensed frequency band, synchronization signal transmission may not occur or a transmitted synchronization signal may be lost due to collision.

SUMMARY OF THE INVENTION

The present invention has been made in an effort to provide a distributed synchronization method which improves network performance.

An exemplary embodiment of the present invention provides a method for a first terminal to perform synchronization in a distributed wireless communication system. The synchronization method may include: if a synchronization signal is received within a synchronization slot, increasing a contention window value of a first terminal to a first contention window value; if no synchronization signal is received within the synchronization slot, decreasing the contention window value of the first terminal to a second contention window value; and determining whether to transmit a synchronization signal or not by using the first contention window value or the second contention window value.

The synchronization signal may include a collision detection field in which a tone signal is transmitted, and the synchronization method may further include, if the synchronization signal is received within the synchronization slot, determining whether to transmit the tone signal or not at a point in time where the collision detection field of the synchronization signal is positioned, corresponding to a backoff counter value of the first terminal.

The synchronization method may further include updating an average contention window value of terminals neighboring the first terminal by using the contention window value contained in the synchronization signal.

The synchronization method may further include setting the average contention window value of terminals neighboring the first terminal, and the increasing may include increasing the contention window value of the first terminal by using the average contention window value and the contention window value of the first terminal.

The decreasing may include decreasing the contention window value of the first terminal by using the average contention window value and the contention window value of the first terminal.

The increasing may further include increasing the contention window value of the first terminal further as the contention window value of the first terminal becomes increasingly smaller than the product of the average contention window value and a predetermined ratio.

The decreasing may further include decreasing the contention window value of the first terminal less as the contention window value of the first terminal becomes increasingly smaller than the product of the average contention window value and a predetermined ratio.

The synchronization signal may include a preamble, a time offset, a collision detection field in which a tone signal is transmitted, and a contention window indication field containing a contention window value.

Another exemplary embodiment of the present invention provides a method for a first terminal to perform synchronization in a distributed wireless communication system. The synchronization method may include: setting a contention window value of a first terminal; randomly selecting a first contention window value as a backoff counter value; changing the first contention window value depending on whether a synchronization signal is received within a synchronization slot or not; and determining whether to transmit a synchronization signal from the first terminal or not, corresponding to the first contention window value.

The changing of the first contention window value may include, if a radio channel is idle for a predetermined period of time within the synchronization slot, decreasing the first contention window value.

The determining may include, if the first contention window value is 0, transmitting a synchronization signal from the first terminal.

Yet another exemplary embodiment of the present invention provides a terminal. The terminal may include: an RF module that receives a synchronization signal; and a processor that changes a contention window value depending on whether the synchronization signal is received or not, sets a backoff counter by using the contention window value, and determines whether to transmit the synchronization signal or not, corresponding to a backoff counter value.

The processor may increase the contention window value if the synchronization signal is received, and may decrease the contention window value if the synchronization signal is not received.

The synchronization signal may include a collision detection field in which a tone signal is transmitted, and if the synchronization signal is received, the processor may determine whether to transmit the tone signal or not at a point in time where the collision detection field of the synchronization signal is positioned, corresponding to the backoff counter value.

The processor may change the contention window value by using the average contention window value of terminals neighboring the terminal and the contention window value.

If the synchronization signal is received, the processor may increase the contention window value further as the contention window value of the first terminal becomes increasingly smaller than the product of the average contention window value and a predetermined ratio.

If the synchronization signal is not received, the processor may decrease the contention window value less as the contention window value of the first terminal becomes increasingly smaller than the product of the average contention window value and a predetermined ratio.

The synchronization signal may include a preamble, a time offset, a collision detection field in which a tone signal is transmitted, and a contention window indication field containing a contention window value.

DETAILED DESCRIPTION OF THE EMBODIMENTS

Figure 1:
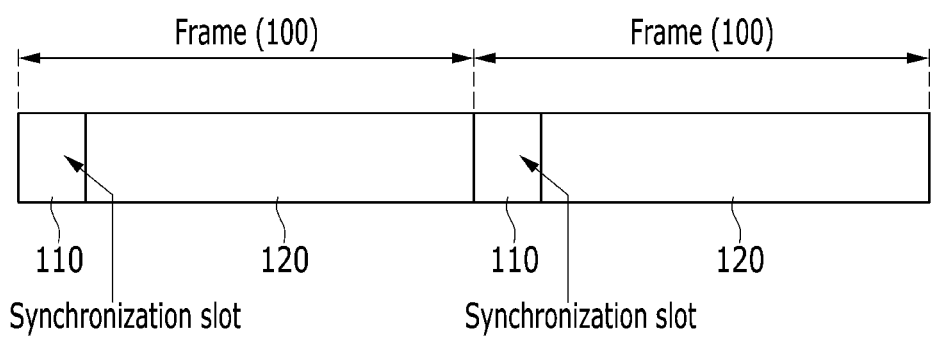
FIG. 1 is a view showing a time resource according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In the specification, a terminal may indicate a mobile terminal (MT), a mobile station (MS), an advanced mobile station (AMS), a high reliability mobile station (HR-MS), a subscriber station (SS), a portable subscriber station (PSS), an access terminal (AT), user equipment (UE), etc., and may include all or some of the functions of the MT, MS, AMS, HR-MS, SS, PSS, AT, UE, etc.

In the specification, a base station (BS) may indicate an advanced base station (ABS), a high reliability base station (HR-BS), a node B (NodeB), an evolved node B (eNodeB), an access point (AP), a radio access station (RAS), a base transceiver station (BTS), a mobile multihop relay base station (MMR-BS), a relay station (RS) serving as a base station, a high reliability relay station (HR-BS) serving as a base station, etc., and may include all or some of the functions of the ABS, HR-BS, NodeB, eNodeB, AP, RAS, BTS, MMR-BS, RS, HR-RS, etc.

Now, a method of synchronization in a distributed communication system (i.e., a distributed synchronization method) and a terminal supporting the same according to an exemplary embodiment of the present invention will be described in detail. The following description will be made under the assumption of a distributed wireless communication system environment, and a concrete description of the distributed wireless communication system will be omitted since this system is known to those having ordinary skill in the art.

FIG. 1 is a view showing a time resource according to an exemplary embodiment of the present invention.

As shown in FIG. 1, the time resource according to the exemplary embodiment of the present invention includes frames 100, which are cyclically repeated intervals. In FIG. 1, it is assumed that the length of each frame 100 is predetermined.

Each frame 100 includes a plurality of slots, and FIG. 1 depicts only synchronization slots 110 out of all the slots. That is, FIG. 1 depicts that a time resource is divided into frames 100 and each frame 100 is segmented into a synchronization slot 110 and the remaining slots 120. The remaining slots 120 may be subdivided into a data slot, a search slot, etc., but are not illustrated in FIG. 1 for ease of explanation.

The synchronization slot 110 is an interval during which terminals transmit a synchronization signal. The terminals may determine the start and end of a frame by using a synchronization signal received in the synchronization slot 110.

In an initialization process, the terminals operate in receive mode during a certain period of time before sending a synchronization signal. By operating in receive mode, the terminals may determine the presence or absence of a synchronization signal transmitted by a neighboring terminal. If there is a synchronization signal transmitted by a neighboring terminal, the terminals synchronize their clocks by using the synchronization signal transmitted by the neighboring terminal. On the other hand, if the terminals receive no synchronization signal transmitted by a neighboring terminal, they arbitrarily set their synchronized clocks. When the terminals "synchronize or set their clocks", it means that they adjust or set their time synchronization with the start and end of a periodic frame 100.

When setting their synchronized clocks, the terminals transmit or receive a synchronization signal in the synchronization slot 110 of each frame. In this case, the synchronization signal is transmitted according to a random access scheme.

Figure 2:
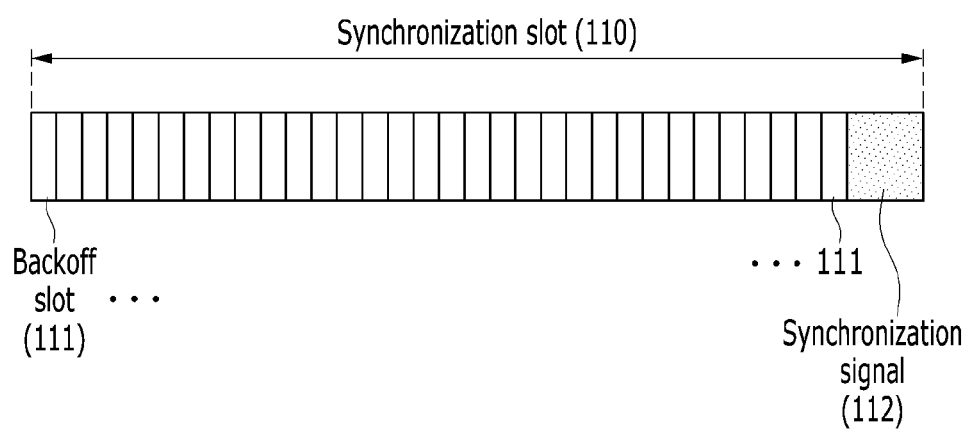
FIG. 2 is a view showing the structure of a synchronization slot according to an exemplary embodiment of the present invention.

FIG. 2 is a view showing the structure of a synchronization slot 110 according to an exemplary embodiment of the present invention.

As shown in FIG. 2, the length of a synchronization slot 110 according to an exemplary embodiment of the present invention is equal to the sum of the length of N backoff slots 111 and the length of one synchronization signal (timing reference signal) 112. That is, the length of the synchronization slot 110 may be expressed by the following Equation 1.

Length of synchronization slot=$N$·(backoff length)+ length of synchronization signal  (Equation 1)

where N is a natural number.

The synchronization signal may be transmitted in any position in the synchronization slot. Meanwhile, the transmission of the synchronization signal is completed within the synchronization slot 110. The synchronization signal 112 is transmitted at the beginning of a back-off slot 111.

Figure 3:
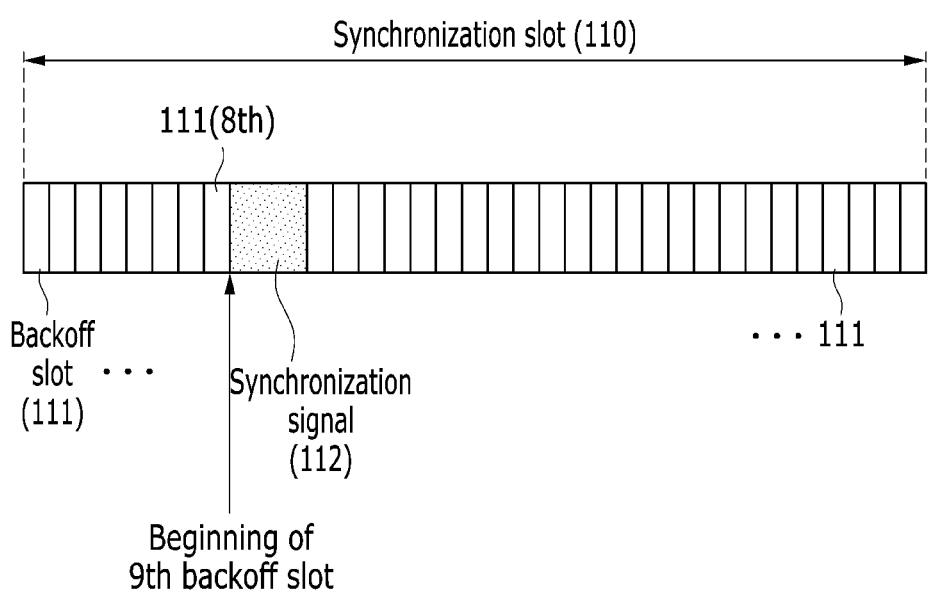
FIG. 3 and FIG. 4 are views showing examples of positions in which a synchronization signal is transmitted.
Figure 4:
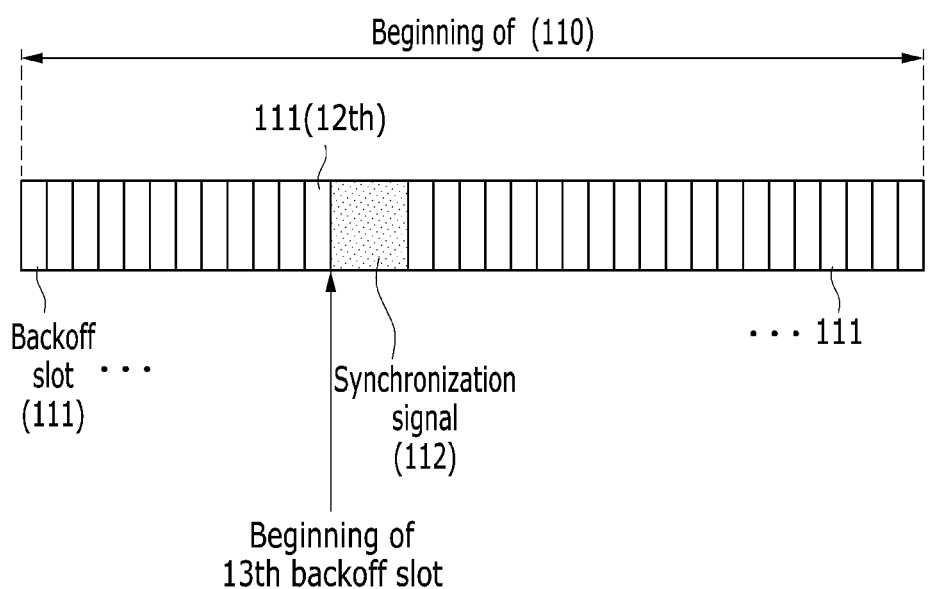

FIG. 3 and FIG. 4 are views showing examples of positions in which a synchronization signal is transmitted.

FIG. 3 shows the transmission of a synchronization signal starting at the beginning of a 9th backoff slot. As shown in FIG. 3, the synchronization signal is transmitted at the beginning of the 9th backoff slot, and the synchronization signal transmission lasts for the length of the synchronization signal.

FIG. 4 shows the transmission of a synchronization signal starting at the beginning of a 13th backoff slot. As shown in FIG. 4, the synchronization signal is transmitted at the beginning of the 13th backoff slot, and the synchronization signal transmission lasts for the length of the synchronization signal.

The terminals store their contention window values in order to avoid collisions of synchronization signals. The contention window is used to prevent synchronization signals transmitted in a synchronization slot by the terminals from colliding each other. A method for terminals to transmit synchronization signals by using a contention window (i.e., a random access method using a contention window) will be described below.

If the contention window of the terminals has a value of CW, a predetermined terminal may randomly select one of integers {0, 1, 2, . . . , CW−1} as the contention window value. Assuming that an integer n is selected, the terminal sets its backoff counter to n. After setting the backoff counter to n, if the radio channel is continuously idle for a period of time corresponding to the length of one backoff slot 111, the terminal reduces its backoff counter by 1 (i.e., to n−1). On the other hand, if the radio channel is not idle at least continuously for a period of time corresponding to one backoff slot 111, the terminal does not reduce its backoff counter. After repeating this operation, the terminal transmits a synchronization signal 112 when its backoff counter reaches zero. In an exemplary embodiment of the present invention, such a procedure is referred to as a 'backoff procedure'.

Meanwhile, if the terminal wants to transmit a synchronization signal but it is determined that the transmission of the synchronization signal is not completed within the synchronization slot 110, the synchronization signal 112 is transmitted simultaneously with the beginning of the next synchronization slot 110. In other words, if the time remaining within the synchronization slot is not enough to transmit one synchronization signal, the terminal does not transmit the synchronization signal in the current synchronization slot even if the backoff counter reaches zero, but instead transmits the synchronization signal simultaneously with the beginning of the next synchronization slot.

A synchronization signal transmitted in a synchronization slot by a terminal includes a preamble, a time offset, a collision detection field CDF, and a contention window indication field CWIF. The preamble is used to estimate the time of receipt of the synchronization signal, and the time offset indicates the difference between the beginning of the synchronization slot and the actual time of transmission of the synchronization signal. The collision detection field CDF is used to indirectly estimate the number of terminals within a network, and the contention window indication field CWIF indicates the contention window value of the terminal that transmits the synchronization signal.

The collision detection field CDF may consist of one OFDM (Orthogonal Frequency Division Multiplexing) symbol. A terminal (hereinafter, 'transmitting terminal') that wants to transmit a synchronization signal divides sub-carriers into M groups, and randomly selects one sub-carrier from each group. Then, the transmitting terminal transmits M tone signals by using M subcarriers selected from each group. If CDFs transmitted by two different transmitting terminals overlap each other, the terminal that receives the synchronization signals may determine that two or more CDFs overlap each other after checking the number or pattern of sub-carriers in the contention detection field CDF.

As explained above, when a terminal detects a synchronization signal transmitted by another terminal, in the synchronization slot 100, it may reduce its backoff counter by 1 without stopping reducing of the backoff counters For example, if terminal A and terminal B have backoff counters of 1 and 5, respectively, and terminal A and terminal B detect a synchronization signal transmitted by the opposing terminal, terminal A and terminal B reduce their backoff counters to 0 and 4, respectively. As the backoff counter is 0, terminal A may transmit a synchronization signal immediately after waiting a certain period of time (e.g., DIFS (Distributed InterFrame Space) or EIFS (Extended InterFrame Space)). Upon detecting a synchronization signal transmitted by the opposing terminal, the terminal may resume the above-explained backoff procedure after waiting a certain period of time (e.g., DIFS or EIFS), rather than immediately after completion of the transmission of the detected synchronization signal. For example, the terminal may resume the backoff procedure after waiting a period of time corresponding to one backoff slot.

Then, if the time remaining in the synchronization slot is shorter than the length of the synchronization signal, the terminals stop the backoff procedure and wait for the next synchronization slot.

Figure 5:
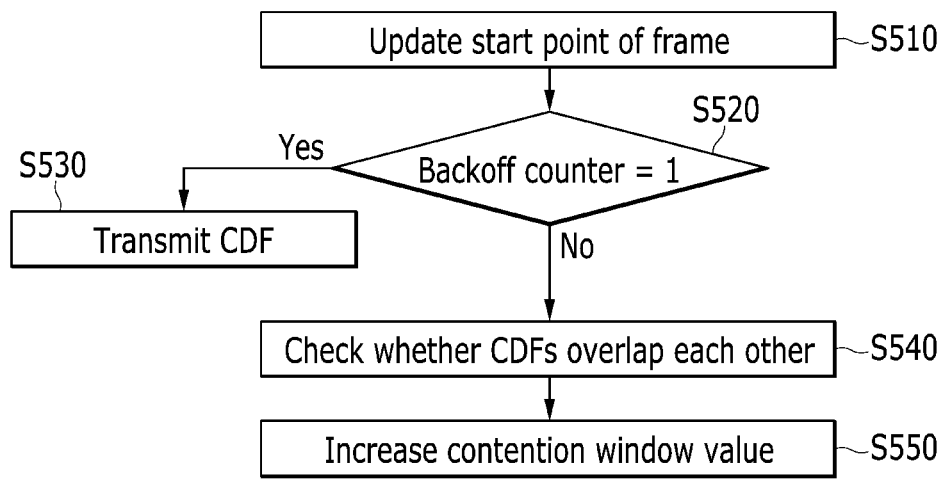
FIG. 5 is a flowchart showing a method of operation used when a terminal detects a synchronization signal transmitted by another terminal.

Referring to FIG. 5, a method of operation used when a terminal detects a synchronization signal transmitted by another terminal will be described.

FIG. 5 is a flowchart showing a method of operation used when a terminal detects a synchronization signal transmitted by another terminal.

First of all, a terminal updates the start point of a frame it has, by using the time offset in the received synchronization signal and the estimated time of receipt of the received synchronization signal (S510). As explained above, the synchronization signal includes a preamble and a time offset. The terminal may estimate the time of receipt of the received synchronization signal by using the preamble of the received synchronization signal. Accordingly, the terminal may update the start point of a frame by using the time offset and the estimated time of receipt of the synchronization signal.

If the backoff counter value is 1, the terminal transmits its collision detection field CDF at a point in time where the collision detection field CDF of the received synchronization signal is positioned (S520 and S530). In this case, the terminal does not transmit the other elements (preamble, time offset, etc.) of the synchronization signal.

Figure 6:
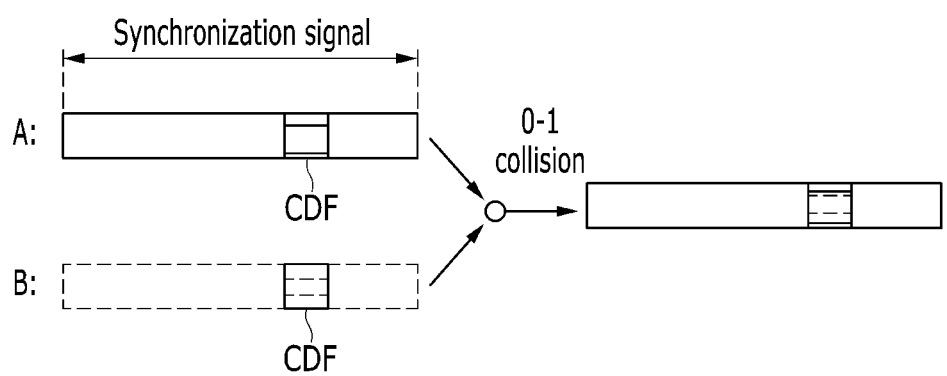
FIG. 6 is a view showing a collision of collision detection fields (CDF).

FIG. 6 is a view showing a collision of collision detection fields CDF. That is, FIG. 6 depicts that terminal A whose backoff counter value is 0 transmits a synchronization signal and terminal B, one of neighboring terminals, whose backoff counter value is 1, transmits a collision detection field CDF. In this case, if two CDFs overlap each other in this way, the neighboring terminals excluding terminal A and terminal B may determine that a collision has occurred.

If the backoff counter value is other than 1, the terminal checks whether the two collision detection fields CDF are received, while overlapping each other, based on the collision detection field CDF of the received synchronization signal (S540). If the two collision detection fields CDF are received, while overlapping each other, the terminal increases its contention window value (S550).

The synchronization signal includes the contention window value of the terminal (i.e., transmitting terminal) that has transmitted the synchronization signal. The terminal that has received the synchronization signal updates the average contention window value of the neighboring terminals by using the contention window value of the transmitting terminal. The terminal that has received the synchronization signal may update the average contention window value as in the following Equation 2.

$$CW_{other}(new)=\beta \cdot CW_{other}(old)+(1-\beta)_{received}$$ (Equation 2)

Here, $CW_{other}(old)$ is the average contention window value before update, and $CW_{received}$ is the contention window value contained in the received synchronization signal. β denotes a value representing a ratio, which is an arbitrary constant.

In S550, the terminal increases the contention window value CW. Hereinafter, the rule of how a terminal increases the contention window value CW will be described.

If the contention window value CW is greater than the product of the average contention window value $CW_{other}$ and a first ratio $th_1$ ($th_1 \cdot CW_{other}<CW$, hereinafter referred to as 'first case'), the terminal increases its contention window value CW by $r_{I1}$ times. The first ratio $th_1$ is a constant arbitrarily set by the user.

If the contention window value CW is greater than the product of the average contention window value $CW_{other}$ and a second ratio $th_2$ and less than the product of the average contention window value $CW_{other}$ and the first ratio $th_1$ ($th_2 \cdot CW_{other}<CW<th_1 \cdot CW_{other}$, hereinafter referred to as 'second case'), the terminal increases its contention window value CW by $r_{I2}$ times. The first ratio $th_1$ is a constant arbitrarily set by the user, and the second ratio $th_2$ is set lower than the first ratio $th_1$.

Next, if the contention window value CW is less than the product of the average contention window value $CW_{other}$ and the second ratio $th_2$ (i.e., $CW<th_2 \cdot CW_{other}$, hereinafter referred to as 'third case'), the terminal increases its contention window value CW by $r_{I3}$ times.

$r_{I1}$, $r_{I2}$, and $r_{I3}$, which are factors by which the contention window value is increased, satisfy the relationship of $r_{I1} \leq r_{I2} \leq r_{I3}$. That is, the terminal increases the contention window value further in the second case than in the first case, and increases the contention window value further in the third case than in the second case.

As explained above, if the terminals receive no synchronization signal within the synchronization slot, they decrease their contention window value CW. Hereinafter, the rule of how a terminal decreases the contention window value CW will be described.

If the contention window value CW corresponds to the first case ($th_1 \cdot CW_{other}<CW$), the terminal decreases its contention window value CW by $r_{D1}$ times.

If the contention window value CW corresponds to the second case ($th_2 \cdot CW_{other}<CW<th_1 \cdot CW_{other}$), the terminal decreases its contention window value CW by $r_{D2}$ times.

Next, if the contention window value CW corresponds to the third case ($CW<th_1 \cdot CW_{other}$), the terminal decreases its contention window value CW by other, $r_{D3}$ times.

$r_{D1}$, $r_{D2}$, and $r_{D3}$, which are factors by which the contention window value is decreased, satisfy the relationship of $r_{D1} \geq r_{D2} \geq r_{D3}$. That is, the terminal decreases the contention window value further in the first case than in the second case, and decreases the contention window value further in the second case than in the third case.

An increase or decrease of the contention window value described above is summed up in the following Table 1.

TABLE 1

|  | $CW < th_2 \cdot CW_{other}$ (first case) | $th_2 \cdot CW_{other} < CE < th_1 \cdot CW_{other}$ (second case) | $th_1 \cdot CW_{other} < CW$ (third case) |
|---|---|---|---|
| Rule of increasing CW value | $CW = CW \cdot r_{I3}$ | $CW = CW \cdot r_{I2}$ | $CW = CW \cdot r_{I1}$ |
| Rule of decreasing CW value | $CW = CW/r_{D3}$ | $CW = CW/r_{D2}$ | $CW = CW/r_{D1}$ |

Upon detecting a synchronization signal transmitted by another terminal within the synchronization slot, the terminal may stop the backoff procedure until the next synchronization slot. This prevents the reception of at least two synchronization signals within the same synchronization slot.

Figure 7:
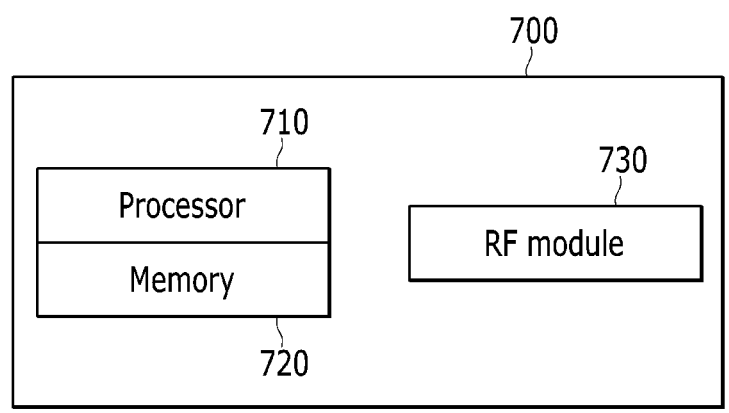
FIG. 7 is a view showing a terminal according to an exemplary embodiment of the present invention.

FIG. 7 is a view showing a terminal according to an exemplary embodiment of the present invention.

As shown in FIG. 7, a terminal 700 according to an exemplary embodiment of the present invention includes a processor 710, a memory 720, and an RF module 730.

The processor 710 may be configured to implement the procedure, method, and functions explained in FIG. 1 to FIG. 6.

The memory 720 is connected to the processor 710, and stores various information associated with the operation of the processor 710.

The RF module 730 is connected to an antenna (not shown), and sends or receives a wireless signal. The antenna may be a single antenna or multiple antennas (MIMO antennas).

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for a terminal to perform synchronization in a distributed wireless communication system, the method comprising:
    if a synchronization signal is received from a neighboring terminal within a synchronization slot, increasing, by the terminal, a contention window value of the terminal to a first contention window value;
    if no synchronization signal is received from the neighboring terminal within the synchronization slot, decreasing, by the terminal, the contention window value of the terminal to a second contention window value;
    determining, by the terminal, whether to transmit a synchronization signal or not by using the first contention window value or the second contention window value, and
    setting, by the terminal, an average contention window value of the neighboring terminal,
    wherein the decreasing comprises decreasing the contention window value of the terminal less as the contention window value of the terminal becomes increasingly smaller than the product of the average contention window value and a predetermined ratio.

2. The method of claim 1, wherein the synchronization signal comprises a collision detection field in which a tone signal is transmitted, and the synchronization method further comprises, if the synchronization signal is received within the synchronization slot, determining, by the terminal, whether to transmit the tone signal or not at a point in time where the collision detection field of the synchronization signal is positioned, corresponding to the backoff counter value of the terminal.

3. The method of claim 1, further comprising updating, by the terminal, the average contention window value by using the contention window value contained in the synchronization signal.

4. The method of claim 1, wherein the increasing comprises increasing the contention window value of the terminal by using the average contention window value and the contention window value of the terminal.

5. The method of claim 4, wherein the increasing comprises increasing the contention window value of the first terminal further as the contention window value of the first terminal becomes increasingly smaller than the product of the average contention window value and a predetermined ratio.

6. The method of claim 1, wherein the synchronization signal comprises a preamble, a time offset, a collision detection field in which a tone signal is transmitted, and a contention window indication field containing a contention window value.

7. A method for a terminal to perform synchronization in a distributed wireless communication system, the method comprising:
    setting, by the terminal, a contention window value of the terminal;
    randomly selecting, by the terminal, a first contention window value as a backoff counter value among the contention window value;
    changing, by the terminal, the first contention window value depending on whether a synchronization signal is received from a neighboring terminal within a synchronization slot or not;
    determining, by the terminal, whether to transmit a synchronization signal from the first terminal or not, corresponding to the first contention window value,
    setting, by the terminal, an average contention window value of the neighboring terminal, and
    decreasing the contention window value of the terminal less as the contention window value of the terminal becomes increasingly smaller than the product of the average contention window value and a predetermined ratio.

8. The method of claim 7, wherein the changing of the first contention window value comprises, if a radio channel is idle for a predetermined period of time within the synchronization slot, decreasing the first contention window value.

9. The method of claim 8, wherein the determining comprises, if the first contention window value is 0, transmitting a synchronization signal from the terminal.

10. A terminal comprising:
    an RF module that receives a synchronization signal from a neighboring terminal; and
    a processor that changes a contention window value depending on whether the synchronization signal is received or not, sets a backoff counter by using the contention window value, and determines whether to transmit the synchronization signal or not, corresponding to the backoff counter,
    wherein the processor changes the contention window value by using an average contention window value of terminals neighboring the terminal and the contention window value, and
    wherein, if the synchronization signal is not received, the processor decreases the contention window value less as the contention window value becomes increasingly smaller than the product of the average contention window value and a predetermined ratio.

11. The terminal of claim 10, wherein the processor increases the contention window value if the synchronization signal is received, and decreases the contention window value if the synchronization signal is not received.

12. The terminal of claim 10, wherein the synchronization signal comprises a collision detection field in which a tone signal is transmitted, and if the synchronization signal is received, the processor determines whether to transmit the tone signal or not at a point in time where the collision detection field of the synchronization signal is positioned, corresponding to the backoff counter value.

13. The terminal of claim 10, wherein, if the synchronization signal is received, the processor increases the contention window value further as the contention window value becomes increasingly smaller than the product of the average contention window value and a predetermined ratio.

14. The terminal of claim 10, wherein the synchronization signal comprises a preamble, a time offset, a collision detection field in which a tone signal is transmitted, and a contention window indication field containing a contention window value.

* * * * *